(12) United States Patent
Nishimura

(10) Patent No.: US 6,847,765 B2
(45) Date of Patent: Jan. 25, 2005

(54) RE-CONNECTABLE OPTICAL INTERFACE SYSTEM AND METHOD FOR OPTICALLY INTERCONNECTING AND DISCONNECTING OPTICAL DEVICES

(75) Inventor: Ken Nishimura, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/099,517

(22) Filed: Mar. 15, 2002

(65) Prior Publication Data

US 2003/0174965 A1 Sep. 18, 2003

(51) Int. Cl.$^7$ .............................................. G02B 6/36
(52) U.S. Cl. ............................ 385/50; 385/44; 385/39; 385/53; 385/55
(58) Field of Search .............................. 385/50, 49, 47, 385/44, 39, 53, 55

(56) References Cited

U.S. PATENT DOCUMENTS

| | | | |
|---|---|---|---|
| 4,057,719 A | * 11/1977 | Lewis | 250/227.22 |
| 4,720,162 A | 1/1988 | Mochizuki et al. | |
| 5,371,820 A | 12/1994 | Welbourn et al. | |
| 5,666,448 A | 9/1997 | Schoenwald et al. | |
| 5,699,462 A | * 12/1997 | Fouquet et al. | 385/18 |
| 5,867,617 A | 2/1999 | Pan et al. | |
| 5,898,803 A | * 4/1999 | Mueller-Fiedler et al. | 385/36 |
| 5,898,806 A | 4/1999 | Nishimoto | |
| 6,370,292 B1 | * 4/2002 | Strake | 385/14 |
| 6,628,452 B2 | * 9/2003 | Haeberle et al. | 359/298 |
| 2002/0191900 A1 | * 12/2002 | Hoffmann et al. | 385/24 |

OTHER PUBLICATIONS

Durning, Edward P. et al. "Measurement of the Ocular Pulse Using Laser Interferometry" Proc. Annual Northeast Bioengineering Conf. Mar. 27, 1989, pp. 159–160.

* cited by examiner

Primary Examiner—Rodney Bovernick
Assistant Examiner—Sung Pak

(57) ABSTRACT

A re-connectable optical interface system and method for optically interconnecting and disconnecting optical devices utilizes an optical insert with a reflective element and an optical structure with a displaceable optically bridging element, which can be positioned between two waveguides of the optical structure, to optically connect the optical devices. The optical insert is a part of a first optical device, while the optical structure is a part of a second optical device. The optical insert and the optical structure can be interconnected to establish an optical connection between the optical insert of the first optical device and at least one of the waveguides of the second optical device. When the optical insert and the optical structure are not interconnected, the optically bridging element is positioned between the waveguides to provide an optical connection between the waveguides. The use of the optical insert and the optical structure allows different optical devices to be interconnected and disconnected with relative ease.

23 Claims, 13 Drawing Sheets

RE-CONNECTABLE OPTICAL INTERFACE SYSTEM AND METHOD FOR OPTICALLY INTERCONNECTING AND DISCONNECTING OPTICAL DEVICES

FIELD OF THE INVENTION

The invention relates generally to optical devices, and more particularly to an optical interface system and method for optically interconnecting optical devices.

BACKGROUND OF THE INVENTION

The development of printed circuit boards (PCBs) has allowed various electronic components, such as resistors, diodes, integrated circuits (IC) and central processing units (CPUs), to be easily connected onto a single structure. PCBs include prefabricated circuits, which are known as "conductor patterns," that provide electrical connections between the electronic components mounted on the PCBs. Depending on the conductor patterns and the mounted electronic components, PCBs may be used in more than one application. Consequently, PCBs can be customized by mounting different electronic components on the PCB.

Electronic components may be mounted on a PCB by soldering the components onto the PCB. On a single-sided PCB, the conductor patterns are fabricated on one side of the PCB and the electronic components are mounted on the opposite side. The electronic components suitable for mounting on PCBs typically include electrically conductive pins that protrude in one direction. The electronic components are mounted on the PCB by inserting the pins of the electronic components through the PCB and then soldering the pins to the conductor patterns. Thus, the mounted electronic components are electrically connected to the conductor patterns of the PCB. The soldering of electronic components to the conductor patterns of a PCB provides an effective method to mount the components onto the PCB and to electrically connect the components to the PCB. However, the soldering method does not allow the mounted electronic components to be easily removed from the PCB.

In order to overcome the difficulty in removing soldered electronic components from PCBs, some PCBs include sockets that are attached to the PCBs and connected to the respective conductor patterns. The sockets are receptacles into which pins of electronic components can be inserted to mount the components to the PCBs. An example of a socket is a Zero Insertion Force (ZIF) socket, which is commonly used to mount a CPU onto a PCB. When an electronic component is inserted into a socket, the pins of the electronic component are electrically connected to the conductor patterns of the PCB through the socket. The electronic component can then be easily removed from the PCB by pulling out the pins of the component from the socket. The electronic component can be remounted to the original PCB or mounted to a different PCB by inserting the pins of the component into the respective socket.

The use of sockets allows electronic components to be electrically connected to and disconnected from PCBs with relative ease. Unfortunately, there is no equivalent mechanism that allows optical components to be optically connected to and disconnected from optical circuit boards (OCBs) with similar ease. OCBs can be viewed as the optical equivalents of PCBs. Similar to the conductor patterns on PCBs, OCBs include waveguides that can be optically connected to various optical components to optically interconnect the optical components. Typically, an optical component is optically connected to an OCB by physically attaching one or more waveguides of the component to the desired waveguides of the OCB by using an adhesive material, such as epoxy. Alternatively, an optical component is optically connected to an OCB by mechanically abutting polished ends of waveguides, and then fixing the waveguides in place. A concern with these prior art methods to optically connect optical components to OCBs is that the optical components cannot be easily connected to and disconnected from the OCBs.

In view of this concern, what is needed is a re-connectable optical interface system and method for optically interconnecting and disconnecting optical devices, such as optical components and OCBs, with relative ease.

SUMMARY OF THE INVENTION

A re-connectable optical interface system and method for optically interconnecting and disconnecting optical devices utilizes an optical insert with a reflective element and an optical structure with a displaceable optically bridging element, which can be positioned between two waveguides of the optical structure, to optically connect the optical devices. The optical insert is a part of a first optical device, while the optical structure is a part of a second optical device. The optical insert and the optical structure can be interconnected to establish an optical connection between the optical insert of the first optical device and at least one of the waveguides of the second optical device. When the optical insert and the optical structure are not interconnected, the optically bridging element is positioned between the waveguides to provide an optical connection between the waveguides. The use of the optical insert and the optical structure allows different optical devices to be interconnected and disconnected with relative ease.

A re-connectable optical interface system in accordance with the invention includes an optical structure and an optical insert. The optical structure includes first and second waveguides, which are separated by an opening. The optical insert includes a reflective element, which can be optically aligned with at least one of the first and second waveguides when the optical insert is inserted into the opening of the optical structure.

In an embodiment, the reflective element of the optical insert includes a mirror or a facet configured to cause total reflection for incident optical signals when the optical insert is inserted into the optical structure.

In another embodiment, the reflective element includes a beamsplitter configured to partially reflect incident optical signals when the optical insert is inserted into the optical structure. In this embodiment, the optical insert may include a mirror positioned to reflect incident optical signals toward the beamsplitter.

In another embodiment, the reflective element includes a polarizing beamsplitter configured to selectively reflect particular polarization components of when the optical insert is inserted into the optical structure. In this embodiment, the optical insert may include an optical element and a mirror. The optical element may include an electrically controllable birefringent material, which may be configurable as a quarter-wave plate.

In an embodiment, the optical structure includes a bridging element configured to establish an optical connection between the first and second waveguides when the bridging element is placed in an optically aligned position in the opening of the optical structure. In this embodiment, the optical structure may include a displacing mechanism configured to position the bridging element to the optically aligned position when no external force is applied, and to permit displacement of the bridging element from the optically aligned position when an external force is applied.

A method for optically interfacing optical devices in accordance with the invention includes the step of providing a first optical device and the step of providing a second optical device. The first optical device includes an optical insert with a reflective element. The second optical device includes first and second waveguides that are separated by an opening. The method further includes the step of inserting the optical insert of the first optical device into the opening of the second optical device, including aligning the reflective element of the optical insert with at least one of the first and second waveguides to establish a new optical connection between the optical insert and one of the optically aligned waveguides.

The method may include the step of displacing a bridging element of the optical structure from the opening. The bridging element is configured to establish an optical connection between the first and second waveguides when the bridging element is positioned in the opening. The method may further include the step of removing the optical insert from the opening, including positioning the bridging element back in the opening to re-establish the optical connection between the first and second waveguides through the bridging element.

In an embodiment, the step of inserting the optical insert into the opening includes aligning a facet of the optical insert, which is configured to cause total reflection for incident light signals, with at least one of the first and second waveguides.

In another embodiment, the step of inserting the optical insert into the opening includes aligning a beamsplitter of the optical insert, which is configured to partially reflect incident optical signals, with at least one of the first and second waveguides.

In still another embodiment, the step of inserting the optical insert into the opening includes aligning a polarizing beamsplitter of the optical insert, which is configured to selectively reflect particular polarization components of incident light signals, with at least one of the first and second waveguides.

Other aspects and advantages of the present invention will become apparent from the following detailed description, taken in conjunction with the accompanying drawings, illustrated by way of example of the principles of the invention.

DETAILED DESCRIPTION

Figure 1:
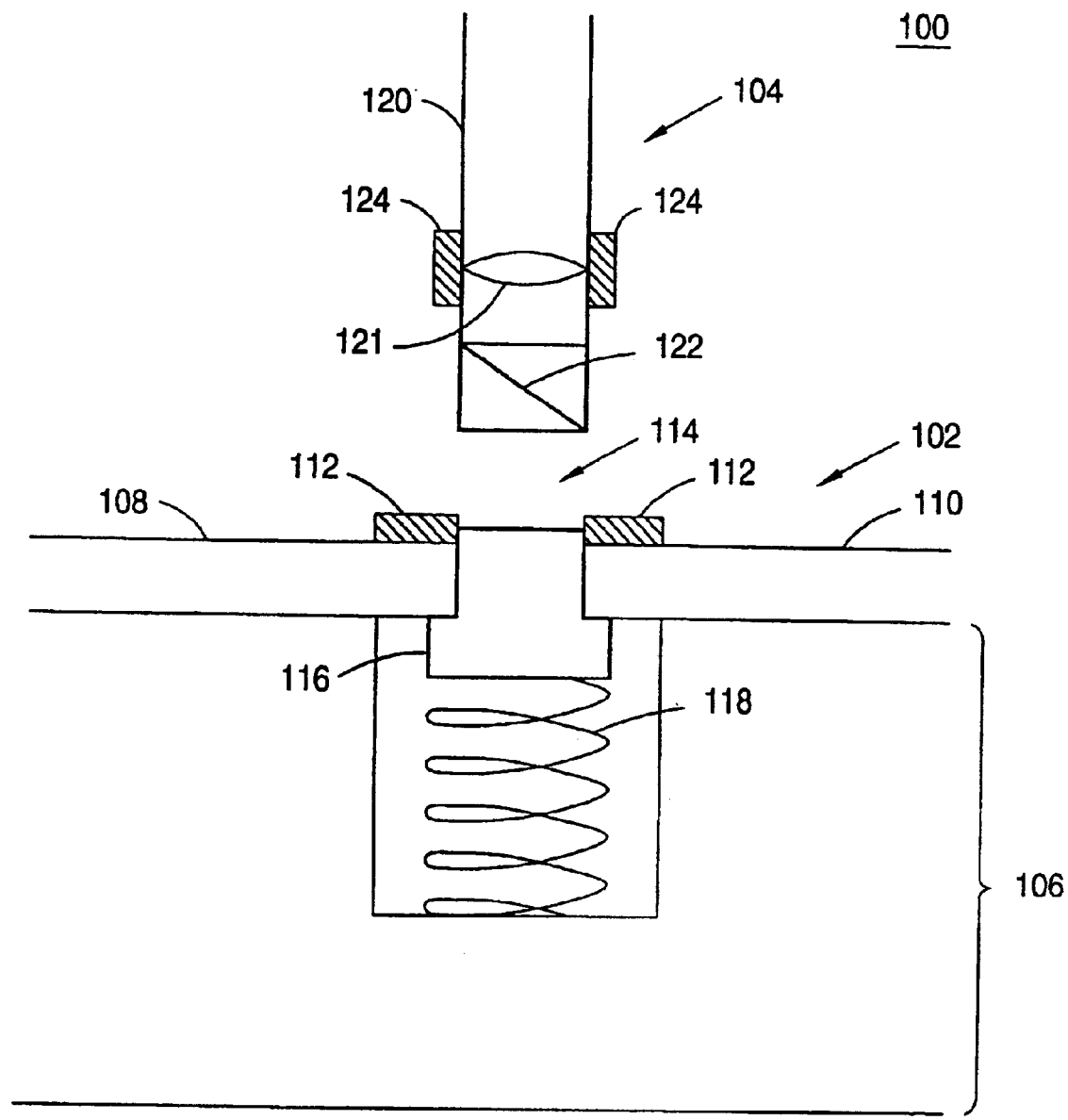
FIG. 1 is a cross-sectional view of a re-connectable optical interface system in accordance with a first embodiment of the present invention.

With reference to FIG. 1, a cross-sectional view of a re-connectable optical interface system 100 in accordance with a first embodiment of the invention is shown. The re-connectable optical interface system includes an optical structure 102 and an optical insert 104 that can be interconnected to establish an optical connection between the optical structure and the optical insert. The configurations of the optical structure and the optical insert are such that the optical insert can be repeatedly connected to and disconnected from the optical structure. Thus, the re-connectable optical interface system provides a desirable means to establish and terminate optical connections between optical devices that embody the re-connectable optical interface system. As an example, the re-connectable optical interface system may be used to connect an optical component to an optical circuit board (OCB). In this example, the optical insert may be a part of the optical component, while the optical structure may be a part of the OCB. Thus, when the optical insert and the optical structure are optically interconnected, the optical component is optically connected to the OCB.

The optical structure 102 of the re-connectable optical interface system 100 includes a substrate 106, waveguides 108 and 110, and aligners 112. The substrate 106 can be made of any material that is commonly used in optical circuits. The waveguides 108 and 110 of the optical structure are positioned on the substrate such that an opening 114 exists between the two waveguides. The opening between the waveguides may be created by forming a via through a single waveguide, which will result in the two waveguides 108 and 110. The aligners 112 of the optical structure are located above the waveguides. The aligners are designed to properly position the optical insert 104 when the optical insert is being connected with the optical structure.

The optical structure 102 further includes an optically bridging element 116 and a displacing mechanism 118. The optically bridging element is a plug that can be positioned in the opening 114 between the waveguides 108 and 110, as illustrated in FIG. 1. Consequently, the optically bridging element has a circular shape to fit in the opening. Furthermore, the optically bridging element has an index of refraction profile that matches the index of refraction profile of the waveguides. Thus, when the optically bridging element is positioned in the opening, an optical connection is established between the waveguides through the optically bridging element.

The displacing mechanism 118 of the optical structure 102 operates to position the optically bridging element 114 within the opening between the waveguides 108 and 110 when no external force is applied to the optically bridging element so that the waveguides are optically connected. However, when a downward pressure is applied to the optically bridging element, the displacing mechanism is configured to yield to the downward pressure, allowing the optically bridging element to be lowered. The downward displacement of the optically bridging element terminates the optical connection between the waveguides through the optically bridging element. The displacing mechanism may be any type of mechanism that is configured to yield to a downward pressure and to return to its original state when the downward pressure is removed. As an example, the displacing mechanism may be a spring with sufficient tension to hold the optically bridging element in the optically aligned position within the opening when no downward pressure is applied to the optically bridging element. However, when a downward pressure is applied, the spring has sufficient give to allow the optically bridging element to be lowered out of the optically aligned position.

Figure 2:
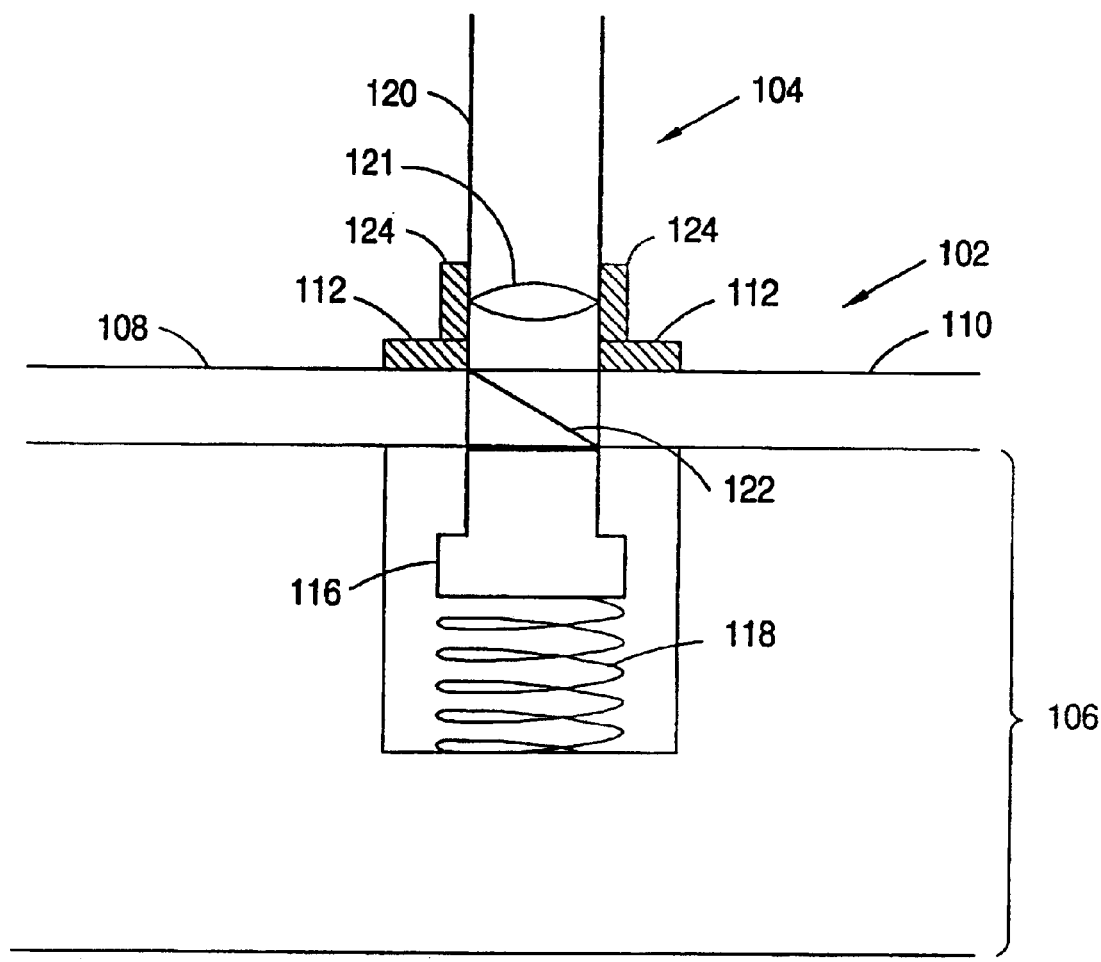
FIG. 2 is a cross-sectional view of the re-connectable optical interface system of FIG. 1 when the optical insert and the optical structure of the system are interconnected.

The optical insert 104 of the re-connectable optical interface system 100 is an optically conductive pin that is designed to be inserted into the opening 114 of the optical structure 102 to optically interface with the waveguide 108 and 110, as illustrated in FIG. 2. When the optical insert 104 is being inserted into the opening 114, the optical insert exerts a downward pressure on the optically bridging element 116, which results in a downward displacement of the optically bridging element. Thus, the optical connection between the waveguides through the optically bridging element is terminated when the optical insert is inserted into the opening. However, due to the displacing mechanism 118 of the optical structure, when the optical insert is removed from the opening of the optical structure, the optically bridging element is raised back to the optically aligned position to re-establish the optical connection between the waveguides through the optically bridging element.

As shown in FIGS. 1 and 2, the optical insert 104 includes an optically conductive region 120, an optional lens 121, a reflective element 122 and aligners 124. The optically conductive region 120 is made of a transparent material, such as silica. The optically conductive region of the optical insert functions as a waveguide for transmission of optical signals through the optical insert. The optional lens 121 can be included in the optical insert to focus or collimate beams of light propagating through the optical insert. The reflective element 122 of the optical insert is located at the end of the optical insert. The aligners 124 of the optical insert are located on the periphery of the optical insert to engage the aligners 112 of the optical structure 102 as the optical insert is being inserted into the opening 114 of the optical structure. When the aligners 112 and 124 make contact, the reflective element of the optical insert is situated in the optically aligned position between the waveguides, as shown in FIG. 2. The reflective element includes a facet, mirror or a Bragg grating, which is orientated at approximately forty-five degrees such that optical signals impinging upon the reflective element horizontally from the left are reflected downward and optical signals impinging upon the reflective element horizontally from the right are reflected upward. Consequently, the reflective element is orientated such that optical signals impinging upon the reflective element from above are reflected horizontally to the right. The reflective element is designed to cause total internal reflection for impinging optical signals. Thus, when the optical insert is connected to the optical structure, a bi-directional optical connection is established between the optical insert and the waveguide 110. Thus, input optical signals transmitted through the optical insert toward the optical structure are reflected rightward to the waveguide 110, while input optical signals from the waveguide 110 are reflected upward through the optical insert. In addition, optical signals transmitted from the waveguide 108 are reflected downward toward the substrate 106 of the optical structure. Thus, the original optical connection between the waveguides through the optically bridging element 116 is terminated when the optical insert and the optical structure are interconnected.

Although not illustrated, the re-connectable optical interface system 100 includes an interlock mechanism to hold the optical insert 104 in place when the optical insert is inserted into the opening 114 of the optical structure 102 to interconnect the optical insert and the optical structure. The interlock mechanism is configured to be disengaged when the optical insert needs to be disconnected from the optical structure.

Figure 3A:
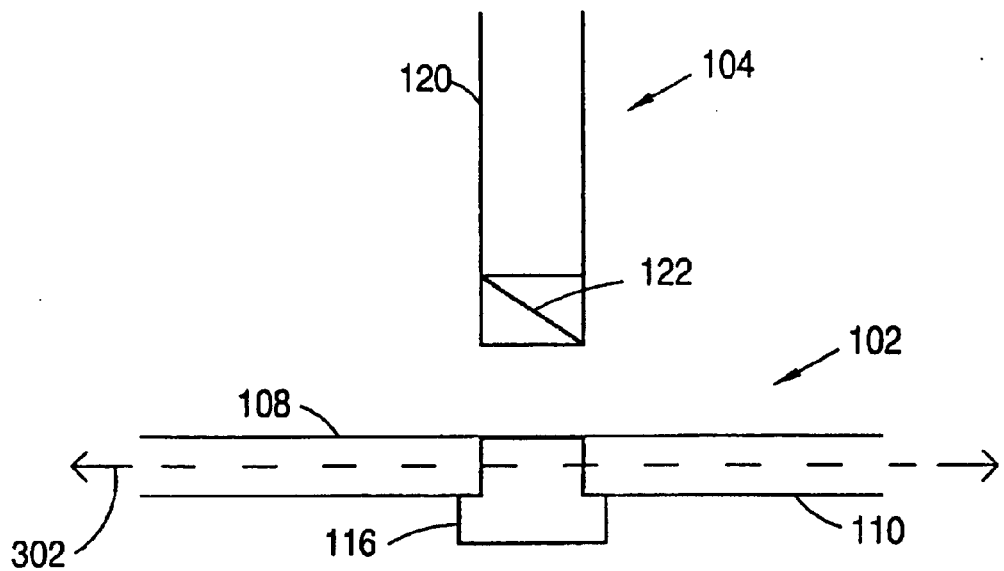
FIGS. 3A–3C are diagrams of optical signal paths through the re-connectable optical interface system of FIG. 1.
Figure 3B:
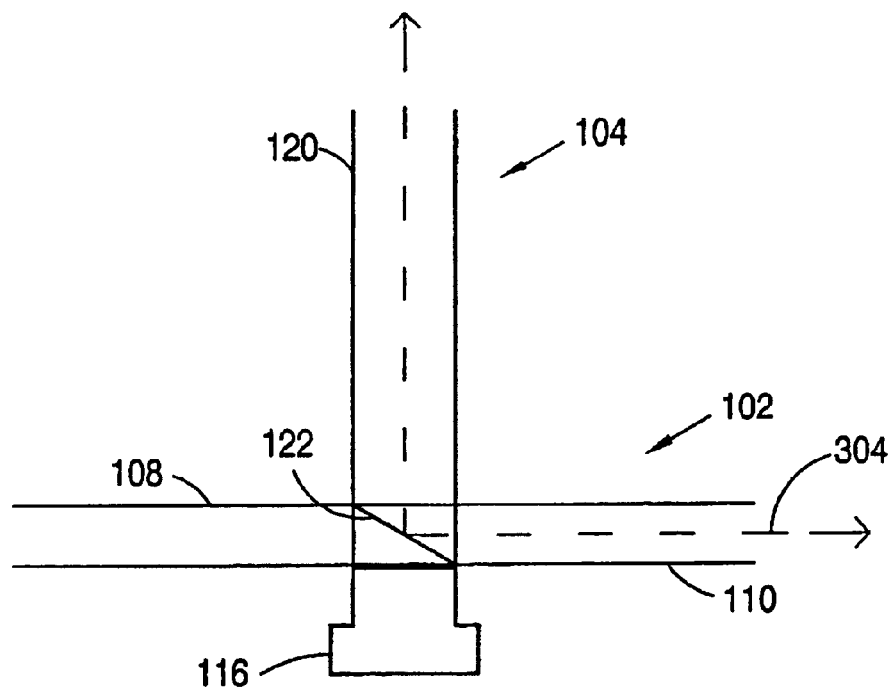
Figure 3C:
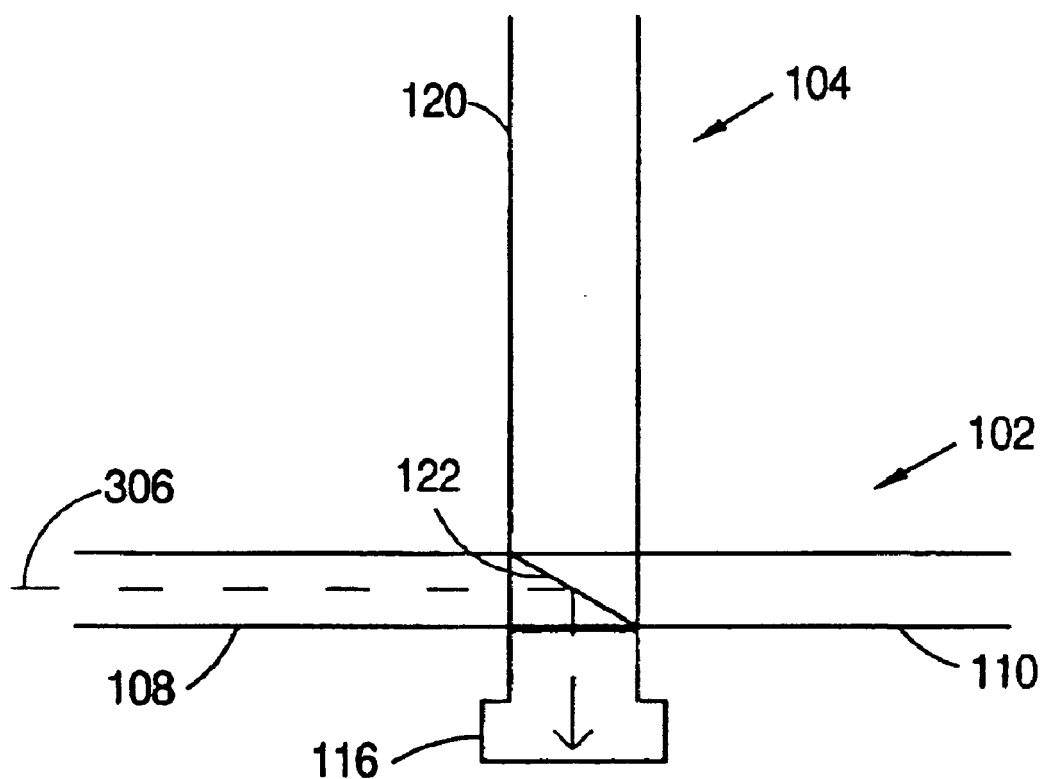

The operation of the re-connectable optical interface system 100 is described with reference to FIGS. 3A, 3B and 3C, which illustrate paths of optical signals through the optical insert 104 and the optical structure 102 of the system. FIG. 3A illustrates the path of optical signals when the optical insert and the optical structure are not interconnected, while FIGS. 3B and 3C illustrate the paths of optical signals when the optical insert and the optical structure are interconnected. As illustrated in FIG. 3A, when the optical insert and the optical structure are not interconnected, a bi-directional optical connection is established between the waveguides 108 and 110 through the optically bridging element 116 such that input optical signals from the waveguide 108 are transmitted to the waveguide 110 along a path 302 and input optical signals from the waveguide 110 are transmitted to the waveguide 108 along the same path.

However, as illustrated in FIGS. 3B and 3C, when the optical insert 104 and the optical structure 102 are interconnected, the optical connection between the waveguides 108 and 110 is terminated and a new bi-directional optical connection between the optical insert and the waveguide 110 is established. Thus, input optical signals from the optical insert are reflected horizontally off the reflective element 122 of the optical insert and are transmitted to the waveguide 110, as illustrated by a path 304 in FIG. 3B. In addition, input optical signals from the waveguide 110 are reflected upward off the reflective element and are transmitted to the optical insert along the same path. However, optical signals from the waveguide 108 are reflected downward off the reflective element and are transmitted toward the substrate of the optical structure, where the optical signals are lost, as illustrated by a path 306 in FIG. 3C. Thus, the waveguide 108 is not connected to either the optical insert or the waveguide 110.

Figure 4:
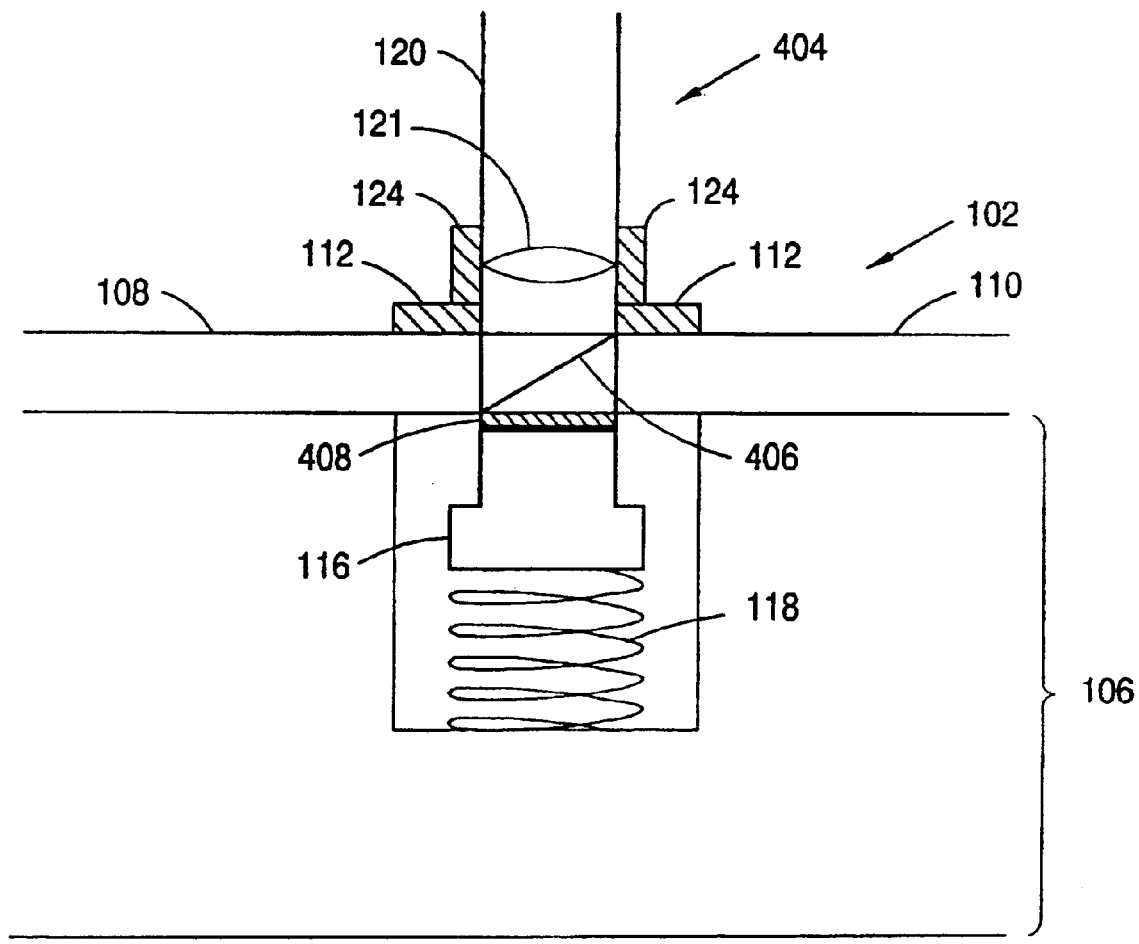
FIG. 4 is a cross-sectional view of a re-connectable optical interface system in accordance with a second embodiment of the present invention.

Turning now to FIG. 4, a re-connectable optical interface system 400 in accordance with a second embodiment of the invention is shown. In FIG. 4, the same reference numbers of FIGS. 1 and 2 are used to identify those elements that are common to both embodiments. The re-connectable optical interface system 400 includes the interlock mechanism (not shown), the optical structure 102 and an optical insert 404. In this embodiment, the optical insert 404 is designed to establish optical connections between the optical insert and the waveguides 108 and 110 of the optical structure such that input optical signals from the waveguide 108 are transmitted to the optical insert and the waveguide 110, input optical signals from the waveguide 110 are transmitted to the optical insert and the waveguide 108, and input optical signals from the optical insert are transmitted to both waveguides. Thus, when connected to the optical structure, the optical insert establishes a bi-directional optical connection between the optical insert and the waveguide 108 and a bi-directional optical connection between the optical insert and the waveguide 110. In addition, the optical insert re-establishes the original bi-directional optical connection between the waveguides. In other words, when the optical insert is connected to the optical structure, the original optical connection between the waveguides through the optically bridging element 116 is replaced by a new optical connection between the waveguides through the optical insert.

The optical insert 404 of the re-connectable optical interface system 400 includes the optically conductive region 120, the optional lens 121, a beamsplitter 406, a mirror 408 and the aligners 124. The beamsplitter 406 is orientated at approximately forty-five degrees to partially reflect a propagating light beam such that half of the light beam is perpendicularly reflected, while the other half of the light beam is transmitted through the beamsplitter without change in direction. As an example, the beamsplitter may include a silver mirror orientated at a forty-five degree angle that is configured to divide an input light beam into two perpendicularly propagating light beams, each light beam having half the intensity of the input light beam. The beamsplitter operates to partially reflect a horizontally propagating light beam that impinges the beamsplitter from the left in an upward direction, and to partially reflect a horizontally propagating light beam that impinges the beamsplitter from the right in a downward direction. Similarly, the beamsplitter operates to partially reflect a vertically propagating light beam that impinges the beamsplitter from above in a horizontal direction to the left, and to partially reflect a vertically propagating light beam that impinges the beamsplitter from the right in a horizontal direction to the right.

The mirror 408 of the optical insert 404 is designed to operate in conjunction with the beamsplitter 406 to provide connectivity between the optical insert and the waveguide 110. The mirror is orientated perpendicular to the length of the optical insert. Furthermore, the mirror is positioned on the optical insert below the beamsplitter. Thus, downward propagating optical signals that impinge upon the mirror are reflected upward back toward the beamsplitter.

The operation of the re-connectable optical interface system 400 is described with reference to FIGS. 5A, 5B, 5C and 5D. When the optical insert 404 and the optical structure 102 are not interconnected, a bi-directional optical connection is established between the waveguides through the optically bridging element 116, as illustrate by an optical path 502 in FIG. 5A. Thus, input optical signals from the waveguide 108 are transmitted to the waveguide 110 through the optically bridging element along the optical path 502. Similarly, input optical signals from the waveguide 110 are transmitted to the waveguide 108 through the optically bridging element along the same optical path.

Figure 5A:
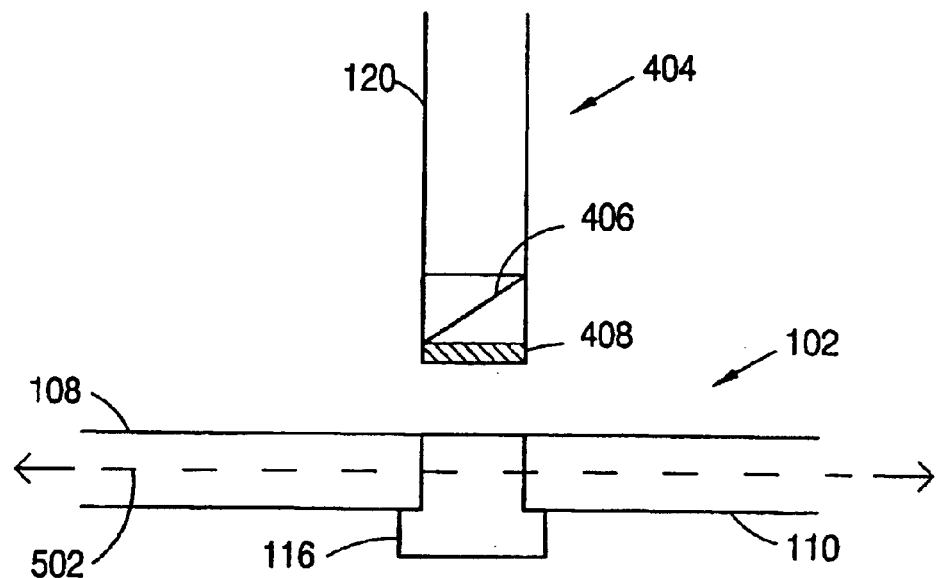
FIGS. 5A–5D are diagrams of optical signal paths through the re-connectable optical interface system of FIG. 4.
Figure 5B:
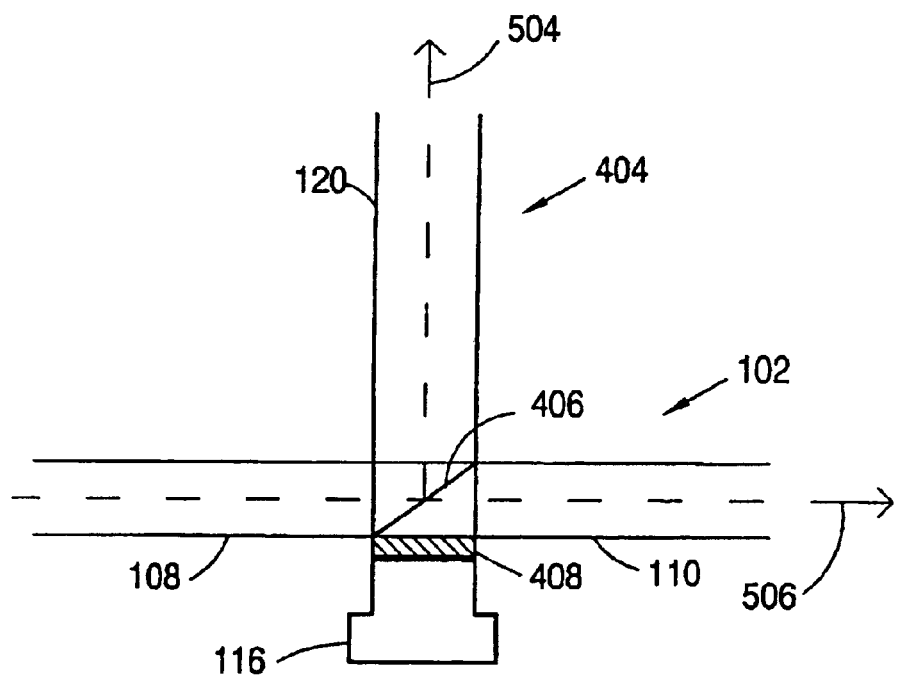
Figure 5C:
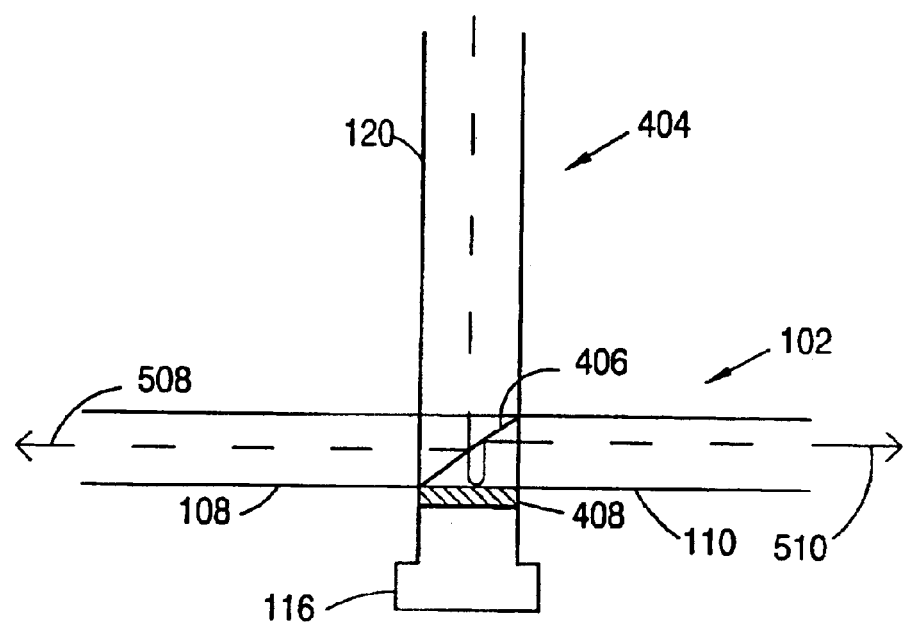
Figure 5D:
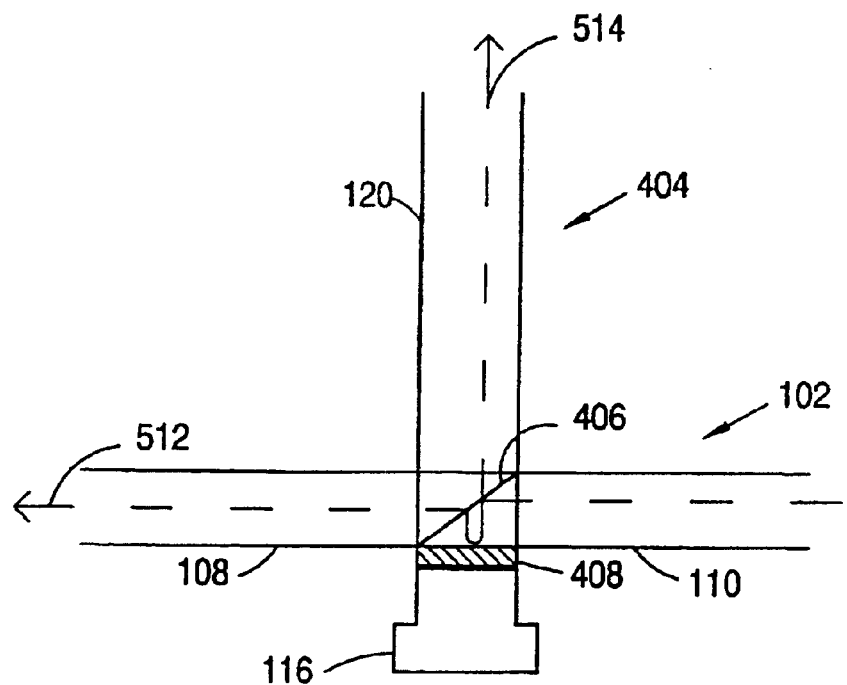

However, when the optical insert 404 and the optical structure 102 are interconnected, the bi-directional optical connection between the waveguides 108 and 110 through the optically bridging element 116 is terminated due to the displacement of the optically bridging element by the optical insert. Furthermore, new optical connections between the optical insert and the waveguides are established, as illustrated in FIGS. 5B, 5C and 5D. The new optical connections include optical connections from the waveguide 108 to the optical insert and the waveguide 110, as illustrated in FIG. 5B. Thus, input optical signals from the waveguide 108 are partially reflected by the beamsplitter 406 of the optical insert such that reflected portions of the optical signals are transmitted upward along the optical insert and non-reflected portions of the optical signals are transmitted to the waveguide 110 through the optical insert, as illustrated by optical paths 504 and 506, respectively.

In addition, the new optical connections established by the interconnection of the optical insert 404 and the optical structure 102 include optical connections from the optical insert to the waveguides 108 and 110, as illustrated in FIG. 5C. Thus, input optical signals from the optical insert are partially reflected by the beamsplitter 406 of the optical insert such that reflected portions of the optical signals are transmitted to the waveguide 108, as illustrated by an optical path 508. In addition, the non-reflected portions of the optical signals are transmitted downward toward the mirror 408 of the optical insert through the beamsplitter. The non-reflected portions of the optical signals are then reflected off the mirror and transmitted back to the beamsplitter. At the beamsplitter, these portions of the optical signals are further partially reflected and transmitted to the waveguide 110, as illustrated by an optical path 510. The non-reflected portions of the optical signals are transmitted back through the optical insert (not illustrated).

Furthermore, the new optical connections established by the interconnection of the optical insert 404 and the optical structure 102 include optical connections from the waveguide 110 to the optical insert and the waveguide 108, as illustrated in FIG. 5D. Thus, input optical signals from the waveguide 110 are partially reflected by the beamsplitter 406 of the optical insert such that non-reflected portions of the optical signals are transmitted to the waveguide 108 through the beamsplitter, as illustrated by an optical path 512. The reflected portions of the optical signals are transmitted toward the mirror 408 of the optical insert. The reflected portions of the optical signals are then reflected off the mirror and transmitted back to the beamsplitter. At the beamsplitter, these portions of the optical signals are further partially reflected such that non-reflected portions of the optical signals are transmitted to the optical insert, as illustrated by an optical path 514. The reflected portions of the optical signals are transmitted back to the waveguide 110 (not illustrated).

Figure 6:
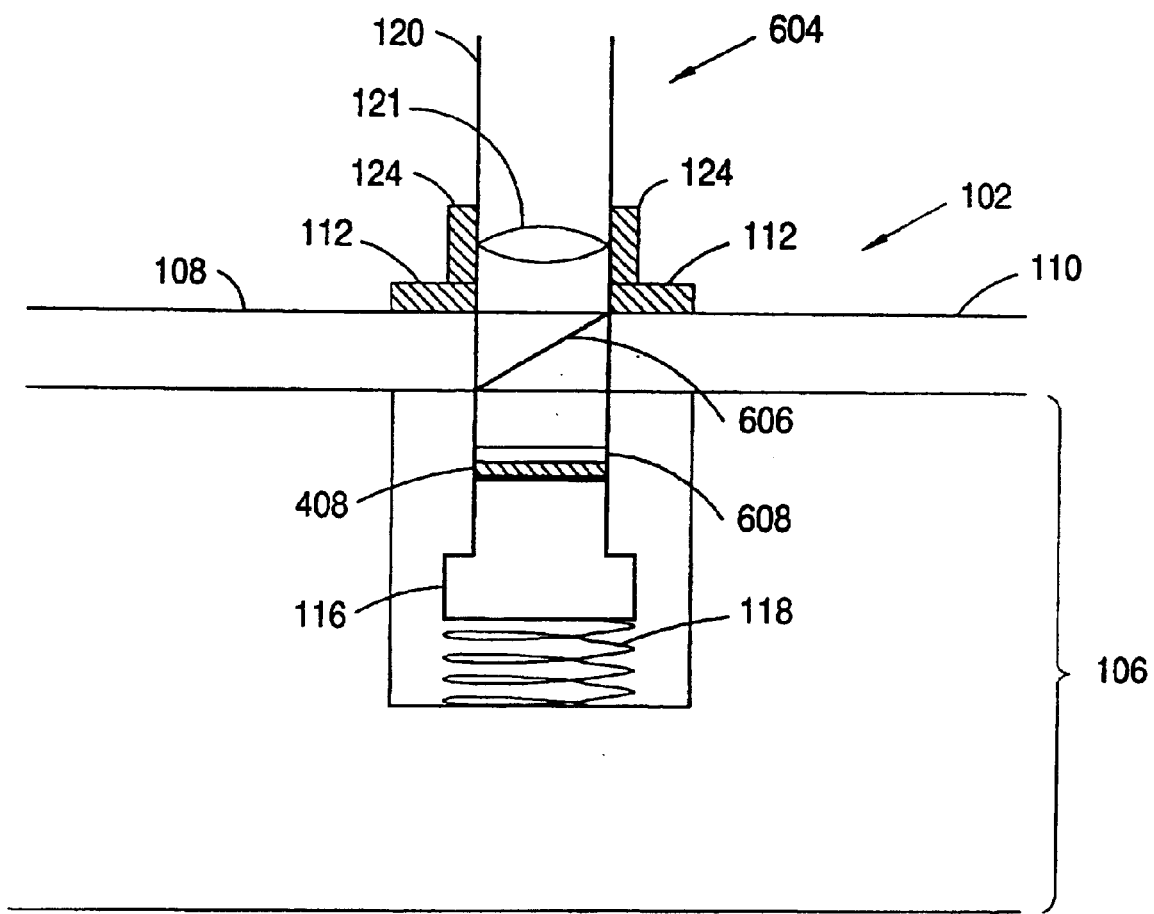
FIG. 6 is a cross-sectional view of a re-connectable optical interface system in accordance with a third embodiment of the present invention.

Turning now to FIG. 6, a re-connectable optical interface system 600 in accordance with a third embodiment of the invention is shown. In FIG. 6, the same reference numbers of FIGS. 1, 2 and 4 are used to identify those elements that are common to the first, second and third embodiments of the invention. The re-connectable optical interface system 600 includes the interlock mechanism (not shown), the optical structure 102 and an optical insert 604. Similar to the optical insert 404 of the re-connectable optical interface system 400 of FIG. 4, the optical insert 604 is designed to establish optical connections between the optical insert and the waveguides 108 and 110, when the optical insert and the optical structure are interconnected. However, in contrast to the optical insert 404, the optical insert 604 is designed to operate on polarization components of input optical signals to transmit the polarization components to the optical insert and the waveguides. In an exemplary configuration, the optical insert 604 can be electrically controlled such that the polarization components of the input optical signals are selectively transmitted to the optical insert and the waveguides. Thus, the optical insert 604 allows the transmission of optical signals through the re-connectable optical interface system 600 to be controlled, when the optical insert and the optical structure of the system are interconnected.

The optical insert 604 of the re-connectable optical interface system 600 includes the optically conductive region 120, the optional lens 121, a polarizing beamsplitter 606, an optical element 608, the mirror 408 and the aligners 124. The polarizing beamsplitter 606 is orientated at approximately forty-five degrees to reflect only a particular polarization component of an impinging light beam. In the exemplary configuration, the polarizing beamsplitter is designed to reflect only the S polarization component of a horizontally propagating light beam such that the S polarization component is reflected either upward or downward, while the P polarization component is transmitted through the polarizing beamsplitter without change in direction. In particular, the S polarization component of a light beam that impinges upon the polarizing beamsplitter from the left is reflected upward and the S polarization component of a light beam that impinges upon the polarizing beamsplitter from the right is reflected downward. Similarly, the polarizing beamsplitter is designed to reflected only the S polarization component of a vertically propagating light beam such that the S polarization component is reflected either horizontally to the left or horizontally to the right, while the P polarization component is transmitted through the polarizing beamsplitter without change in direction. In particular, the S polarization component of a light beam that impinges upon the polarizing beamsplitter from above is reflected horizontally to the left and the S polarization component of a light beam that impinges upon the polarization beamsplitter from below is reflected horizontally to the right.

The optical element 608 of the optical insert 604 is positioned between the polarizing beamsplitter 606 and the mirror 408. The optical element is a quarter-wave plate that operates to switch the polarization direction of polarization components of optical signals as the polarization components propagate twice through the quarter-wave plate due to the mirror. In the exemplary configuration, the optical element is a controllable quarter-wave plate. In this configuration, the optical element includes a layer of electrically controlled birefringent (ECB) material (not shown), such as a liquid crystal cell or a slab of Lithium Niobate, and electrodes (not shown), which can generate an electric field within the ECB layer. The ECB layer can be switched between an active state and an inactive state using an electric field. In the active state, the ECB layer functions as a quarter-wave plate. In the inactive state, the ECB layer becomes optically passive. In one embodiment, the ECB layer is configured to switch to the active state when an electric field is applied. In another embodiment, the ECB layer is configured to switch to the inactive state when an electric field is applied. The thickness and orientation of the ECB layer are predefined to provide quarter-wave retardation of a particular direction of polarization for a propagating light beam when the ECB layer is switched to the active state. Thus, when the ECB layer is switched to the active state, the optical element functions as a quarter-wave plate. However, when the ECB layer is switched to the inactive state, the optical element becomes optically passive. Consequently, when the ECB layer is switched to the active state, the optical element in conjunction with the mirror 408 operates to switch the polarization directions of S and P polarization components, as described in more detail below. In contrast, when the ECB layer is switched to the inactive state, the optical element becomes optically passive and allows the S and P polarization components to be reflected from the mirror without changes in polarization directions.

The operation of the re-connectable optical interface system 600 is described with reference to FIGS. 7A, 7B, 7C, 7D, 7E and 7F. When the optical insert 604 and the optical structure 102 are not interconnected, a bi-directional optical connection is established between the waveguides 108 and 110 through the optically bridging element 116 of the optical structure, as illustrated by an optical path 702 in FIG. 7A. Thus, input optical signals from the waveguide 108 are transmitted to the waveguide 110 through the optically bridging element 116 along the optical path 702. Similarly, input optical signals from the waveguide 110 are transmitted to the waveguide 108 through the optically bridging element along the same optical path.

Figure 7A:
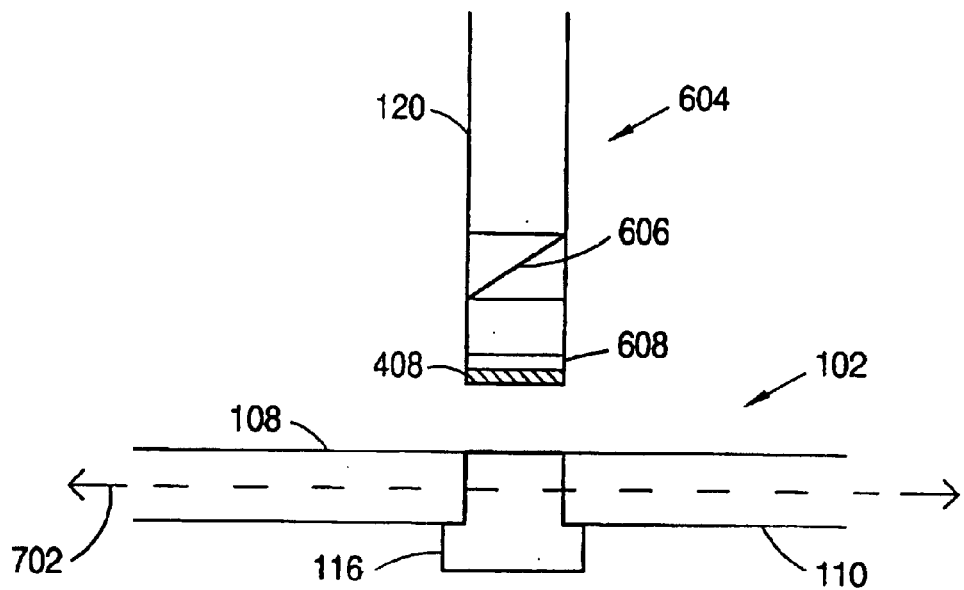
FIGS. 7A–7F are diagrams of optical signal paths through the re-connectable optical interface system of FIG. 6.
Figure 7B:
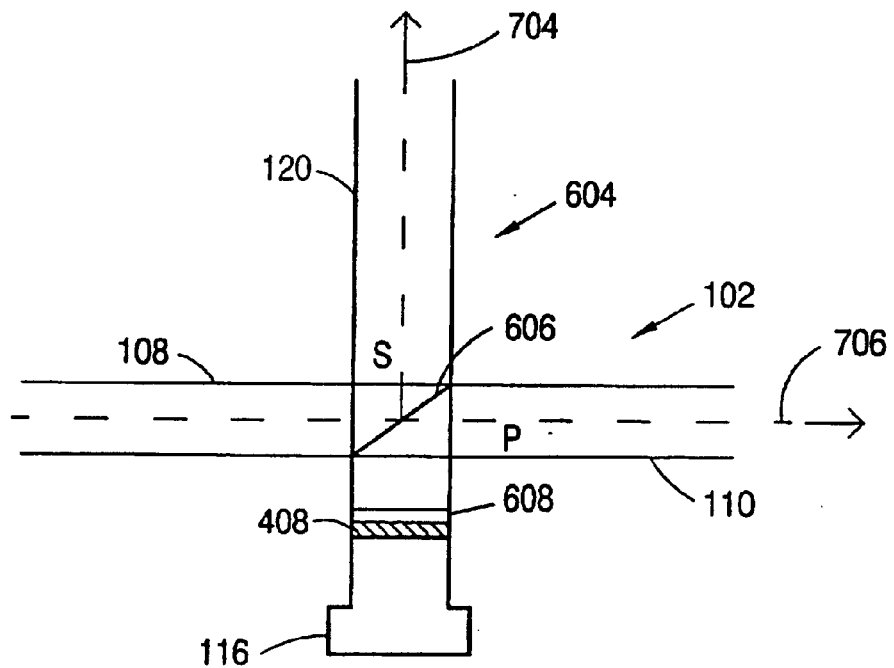

However, when the optical insert 604 and the optical structure 102 are interconnected, the bi-directional optical connection between the waveguides 108 and 110 through the optically bridging element 116 is terminated due to the displacement of the optically bridging element by the optical insert. Furthermore, new optical connections between the optical insert and the waveguides are established, as illustrated in FIGS. 7B, 7C, 7D, 7E and 7F. The new optical connections include optical connections from the waveguide 108 to the optical insert 604 and the waveguide 110, as illustrated in FIG. 7B by optical paths 704 and 706. The optical path 704 illustrates the path of the S polarization components of input optical signals from the waveguide 108, while the optical path 706 illustrates the path of the P polarization components of the input optical signals. The S polarization components of the input optical signals from waveguide 108 are reflected upward by the polarizing beamsplitter 606 of the optical insert and are transmitted through the optical insert, as depicted by the optical path 704. The P polarization components of the input optical signals are transmitted through the polarizing beamsplitter to the waveguide 110 without change in direction, as depicted by the optical path 706.

Figure 7C:
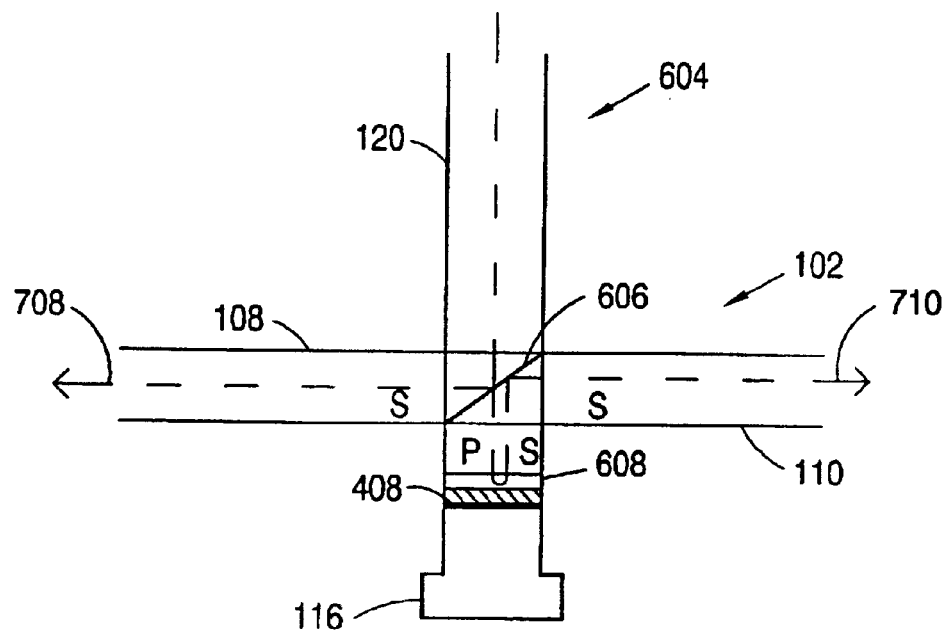
Figure 7D:
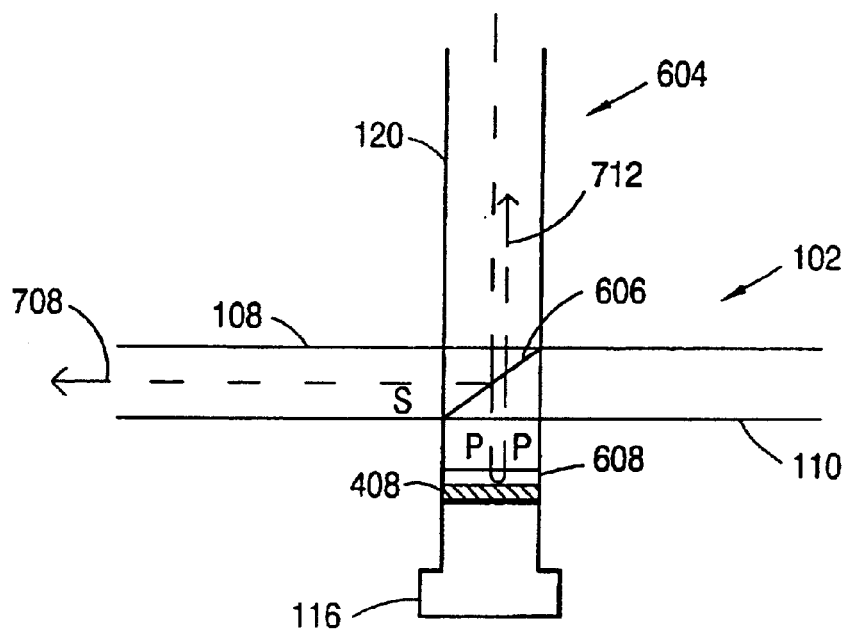

The new optical connections established by the interconnection of the optical insert 604 and the optical structure 102 also include optical connections from the optical insert to the waveguides 108 and 110, as illustrated by optical paths 708, 710 and 712 in FIGS. 7C and 7D. The optical path 708 in FIGS. 7C and 7D illustrates the path of the S polarization components of input optical signals from the optical insert, regardless of the optical state of the optical element 608 of the optical insert. The optical path 710 in FIG. 7C illustrates the path of the P polarization components of the input signals when the optical element is activated as a quarter-wave plate, while the optical path 712 in FIG. 7D illustrates the path of the P polarization components when the optical element is deactivated to a passive state. The S polarization components of the input optical signals from the optical insert are reflected horizontally to the left by the polarizing beamsplitter 606 of the optical insert and are transmitted to the waveguide 108, as shown by the optical path 708. The P polarization components of the input optical signals are transmitted through the polarizing beamsplitter to the mirror 408 of the optical insert without change in direction and are reflected back off the mirror to the polarizing beamsplitter, as illustrated by the paths 710 and 712 in FIGS. 7C and 7D, respectively. However, the polarization directions of the returning polarization components depend on the optical state of the optical element 608.

When the optical element 608 is activated to function as a quarter-wave plate, the P polarization components are twice retarded by the optical element. As the P polarization components propagate through the optical element, the linear P polarization components are converted into circular polarization components by the optical element. The circular polarization components are then reflected off the mirror 408, which changes the handedness of the circular polarization components. As the reflected circular polarization components again propagate through the optical element, the circular polarization components are converted back to linear polarization components. However, due to change in handedness, the original P polarization components are converted to S polarization components. Consequently, when the converted S polarization components impinge upon the polarizing beamsplitter 606, these polarization components are reflected horizontally to the right by the polarizing beamsplitter and transmitted to the waveguide 110, as shown by the optical path 710 in FIG. 7C.

However, when the optical element 608 is deactivated to a passive state, the polarization directions of the P polarization components are not altered by the optical element 606. Thus, the P polarization components are reflected off the mirror 408 and impinge upon the polarizing beamsplitter as P polarization components. Consequently, the reflected P polarization components are transmitted upward through the polarizing beamsplitter back to the optical insert, as shown by the optical path 712 in FIG. 7D. Thus, when the optical element 608 is deactivated, the input signals from the optical insert are not transmitted to the waveguide 110.

Figure 7E:
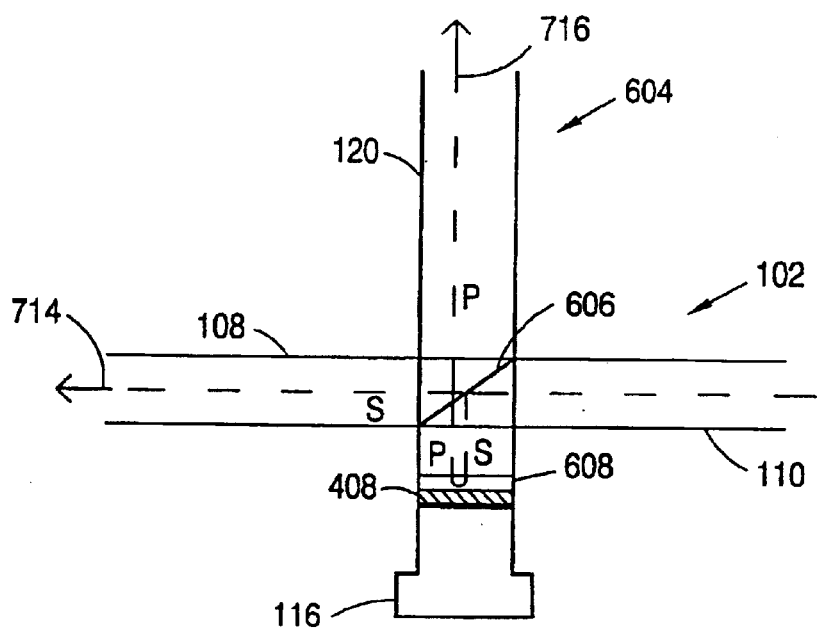
Figure 7F:
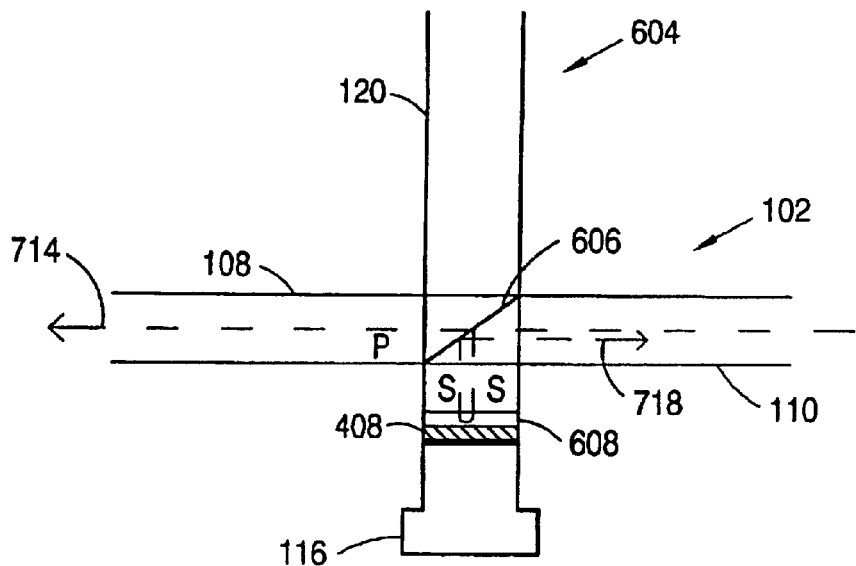

The new optical connections established by the interconnection of the optical insert 604 and the optical structure 102 further include optical connections from the waveguide 110 to the optical insert and the waveguide 108, as illustrated by optical paths 714, 716 and 718 in FIGS. 7E and 7F. The optical path 714 in FIGS. 7E and 7F illustrates the path of the P polarization components of input optical signals from the waveguide 110, regardless of the optical state of the optical element 608 of the optical insert. The optical path 716 in FIG. 7E illustrates the path of the S polarization components of the input signals when the optical element is activated to function as a quarter-wave plate, while the optical path 718 in FIG. 7F illustrates the path of the S polarization components when the optical element is deactivated to a passive state. The P polarization components of the input optical signals from waveguide 110 are transmitted through the polarizing beamsplitter 606 without change in direction to the waveguide 108, as shown by the path 714 in FIGS. 7E and 7F. The S polarization components of the input optical signals are reflected downward by the polarizing beamsplitter 606 to the mirror 408 and are reflected back off the mirror to the polarizing beamsplitter, as illustrated by the paths 716 and 718 in FIGS. 7E and 7F, respectively. However, the polarization directions of the returning polarization components again depend on the optical state of the optical element 608.

When the optical element 608 is activated to function as a quarter-wave plate, the S polarization components are converted to P polarization components by the optical element, as described above in reference to FIG. 7C. Thus, when the converted P polarization components impinge upon the polarizing beamsplitter 606, these polarization components are transmitted through the polarizing beamsplitter to the optical insert without change in direction, as shown by the optical path 716 in FIG. 7E. However, when the optical element is deactivated to a passive state, the polarization direction of the S polarization components is not altered by the optical element. Thus, the S polarization components are reflected off the mirror 408 and impinge upon the polarizing beamsplitter as S polarization components. Consequently, the S polarization components are then reflected horizontally to the right by the polarizing beamsplitter and are transmitted back to the waveguide 110, as shown by the optical path 718 in FIG. 7F. Thus, when the optical element 608 is deactivated, the input optical signals from the waveguide 110 are not transmitted to the optical insert.

Figure 8:
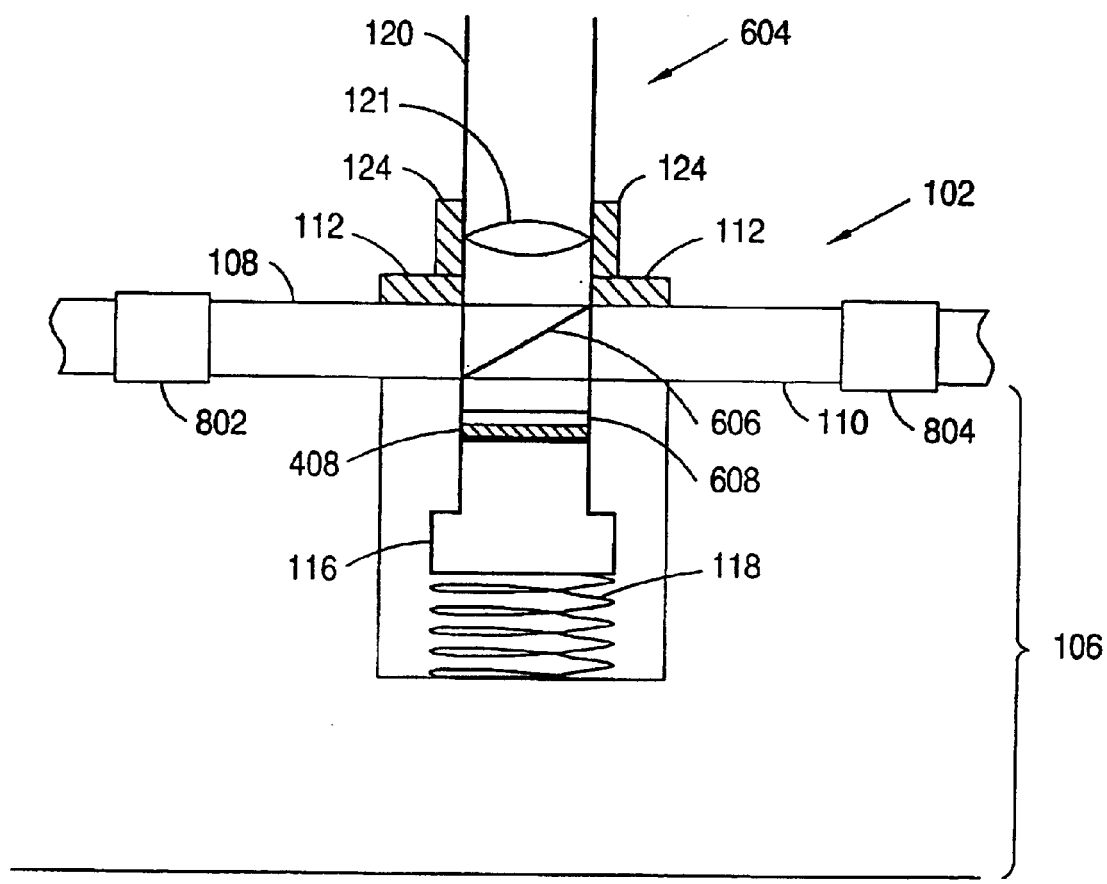
FIG. 8 is a cross-sectional view of the re-connectable optical interface system of FIG. 6 in accordance with an alternative configuration.

Turning now to FIG. 8, the re-connectable optical interface system 600 in accordance with an alternative configuration is shown. In this configuration, the optical structure 102 of the re-connectable optical interface system 600 includes optical polarization elements 802 and 804. The optical polarization elements may be polarizers or polarization rotators to selectively transmit only S or P polarization components along the waveguides 108 and 110. Consequently, the paths of optical signals from the waveguides when the optical insert 604 and the optical structure 102 are interconnected will depend on the optical properties of the optical polarization elements.

Figure 9:
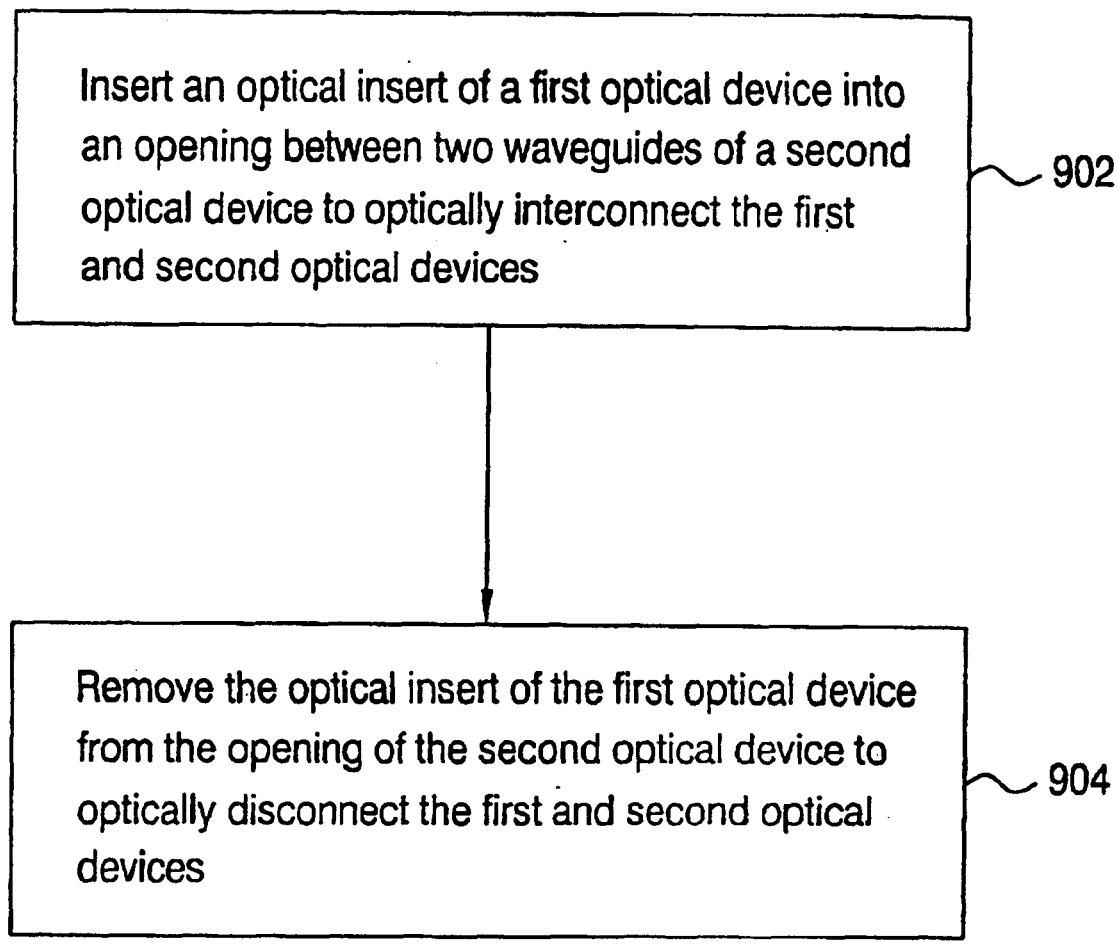
FIG. 9 is a flow diagram of a method for optically interconnecting and disconnecting optical devices in accordance with an embodiment of the present invention.

A method for optically interconnecting and disconnecting optical devices in accordance with an embodiment of the invention is described with reference to a flow diagram of FIG. 9. At step 902, an optical insert of a first optical device, which may be any type of optical component, is inserted into an opening between two waveguides of a second optical device, which may be an OCB, such that a reflective element of the optical insert is optically aligned with the waveguides to establish one or more optical connections between the optical insert and the waveguides. The insertion of the optical insert causes an optically bridging element of the second optical device to be displaced from the opening between the two waveguide of the second optical device, which terminates an optical connection between the two waveguides through the optically bridging element. At an optional step 904, the optical insert of the first optical device is removed from the opening of the second optical device to optically disconnect the first and second optical devices. The removal of the optical insert causes the optically bridging element of the second optical device to be positioned back to the opening between the two waveguides to re-establish the optical connection between the waveguides. In this fashion, the first optical device can be repeatedly connected to the second optical device. Alternatively, when the first and second optical devices are disconnected, one or both of the first and second optical devices may be connected to different optical devices.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical device configured to connect to an optical structure having a first waveguide and a second waveguide separated by an opening, the optical device comprising:

an optical insert including a reflective element, said optical insert being configured to be inserted into said opening between said first and second waveguides to move an optically bridging plug positioned between said first and second waveguides such that an optical connection is established between said optical insert and as least one of said first and second waveguides when said reflective element is optically aligned with said at least one of said first and second waveguides.

2. The optical device of claim 1, wherein said reflective element includes a mirror.

3. The optical device of claim 1, wherein said reflective element includes a facet configured to cause total reflection for incident light.

4. The optical device of claim 1, wherein said reflective element includes a beamsplitter configured to partially reflect incident light.

5. The optical device of claim 4, wherein said optical insert includes a mirror positioned to reflect incident light toward said beamsplitter.

6. The optical device of claim 1, wherein said reflective element includes a polarizing beamsplitter configured to selectively reflect a particular polarization component of incident light.

7. The optical device of claim 6, wherein said optical insert includes an optical element and a mirror, said optical element being positioned between said polarizing beamsplitter and said mirror, said optical element being configured as a quarter-wave plate.

8. The optical device of claim 7, wherein said optical element includes an electrically controllable birefringent material, said electrically controllable birefringent material being electrically configurable as a quarter-wave plate.

9. An optical interface system comprising:
an optical structure including a first waveguide and a second waveguide, said first and second waveguides being separated by an opening; and
an optical insert including a reflective element, said optical insert being configured to be inserted into said opening to establish an optical connection with at least one of said first and second waveguides when said reflective element is optically aligned with said at least one of said first and second waveguides,
wherein said optical structure further includes an optically bridging plug configured to establish an optical connection between said first and second waveguides when said optically bridging plug is placed in an optically aligned position in said opening, said optically bridging plug being further configured to be moved out of said optically aligned position when said optical insert is inserted into said opening.

10. The optical interface system of claim 9, wherein said reflective element includes a mirror.

11. The optical interface system of claim 9, wherein said reflective element includes a facet configured to cause total reflection for incident optical signals when said optical insert is inserted into said optical structure.

12. The optical interface system of claim 9, wherein said reflective element includes a beamsplitter configured to partially reflect incident optical signals when said optical insert is inserted into said optical structure.

13. The optical interface system of claim 12, wherein said optical insert includes a mirror positioned to reflect incident optical signals toward said beamsplitter.

14. The optical interface system of claim 9, wherein said reflective element includes a polarizing beamsplitter configured to selectively reflect particular polarization components of incident optical signals when said optical insert is inserted into said optical structure.

15. The optical interface system of claim 14, wherein said optical insert includes an optical element and a mirror, said optical element being positioned between said polarizing beamsplitter and said mirror, said optical element being configured as a quarter-wave plate.

16. The optical interface system of claim 15, wherein said optical element includes an electrically controllable birefringent material, said electrically controllable birefringent material being electrically configurable as a quarter-wave plate.

17. The optical interface system of claim 9, wherein said optical structure additionally includes a displacing mechanism operatively coupled to said optically bridging plug, said displacing mechanism being configured to position said optically bridging plug to said optically aligned position when no external force is applied, and to permit displacement of said optically bridging plug from said optically aligned position when an external force is applied.

18. A method for optically interfacing optical devices, the method comprising:
providing a first optical device including an optical insert comprising a reflective element;
providing a second optical device including first and second waveguides and an opening therebetween, said second optical device further including an optically bridging plug configured to establish an optical connection between said first and second waveguides when said bridging element is positioned in said opening; and
inserting said optical insert into said opening, including displacing said optically bridging plug and aligning said reflective element of said optical insert with at least one of said first and second waveguides to establish a new optical connection between said optical insert and said at least one of said first and second waveguides.

19. The method of claim 18, additionally comprising removing said optical insert from said opening, including positioning said optically bridging plug back in said opening to re-establish said optical connection between said first and second waveguides through said optically bridging plug.

20. The method claim 18, wherein said aligning of said reflective element of said optical insert with said at least one of said first and second waveguides includes aligning a facet of said optical insert with said at least one of said first and second waveguides, said facet being orientated to establish said new optical connection between said optical insert and said at least one of said first and second waveguides when said facet is optically aligned with said at least one of said first and second waveguides, said facet being configured to cause total reflection for incident optical signals.

21. The method of claim 18, wherein: said optical insert additionally includes a beamsplitter configured to partially reflect incident optical signals; and said aligning of said reflective element of said optical insert with said at least one of said first and second waveguides includes aligning said beamsplitter with said at least one of said first and second waveguides, said beamsplitter being orientated to establish said new optical connection between said optical insert and said at least one of said first and second waveguides when said beamsplitter is optically aligned with said at least one of said first and second waveguides.

22. The method of claim 18, wherein: said optical insert additionally includes a polarizing beamsplitter configured to selectively reflect particular polarization components of incident optical signals; and said aligning of said reflective element with said at least one of said first and second waveguides includes aligning said polarizing beamsplitter with said at least one of said first and second waveguides, said polarizing beamsplitter being orientated to establish said new optical connection between said optical insert and said at least one of said first and second waveguides when said polarizing beamsplitter is optically aligned with said at least one of said first and second waveguides.

23. The method of claim 22, wherein said optical insert additionally includes an electrically controllable optical element, and said method additionally comprises selectively manipulating polarization directions of polarization components of said incident optical signals.

* * * * *